(12) United States Patent
Gloodt

(10) Patent No.: US 6,644,333 B2
(45) Date of Patent: Nov. 11, 2003

(54) HAND-HELD SHOWER SYSTEM WITH INLINE ADJUSTABLE TEMPERATURE/ PRESSURE BALANCED MIXING VALVE

(76) Inventor: Cary Gloodt, 2889 Springmeadow Ct., Indianapolis, IN (US) 46268

( * ) Notice: Subject to any disclaimer, the term of this patent is extended or adjusted under 35 U.S.C. 154(b) by 87 days.

(21) Appl. No.: 09/960,440

(22) Filed: Sep. 21, 2001

(65) Prior Publication Data

US 2002/0043281 A1 Apr. 18, 2002

Related U.S. Application Data

(60) Provisional application No. 60/240,609, filed on Oct. 16, 2000.

(51) Int. Cl.[7] ............................................. G05D 11/00
(52) U.S. Cl. ........................ 137/9; 137/100; 137/597; 4/578; 4/663
(58) Field of Search .................. 137/597, 599.03, 137/599.04, 9, 100; 4/578, 663

(56) References Cited

U.S. PATENT DOCUMENTS

| | | | | |
|---|---|---|---|---|
| 391,647 A | * | 10/1888 | Reid | 137/599.03 |
| 4,454,613 A | | 6/1984 | Palmer | 4/300 |
| 4,706,709 A | * | 11/1987 | Monch | 137/597 |
| 5,185,893 A | * | 2/1993 | Lin | 137/597 |
| 5,725,010 A | * | 3/1998 | Marty et al. | 137/100 |
| 5,845,670 A | | 12/1998 | Life | 137/119.05 |
| 5,884,652 A | * | 3/1999 | Yeh et al. | 137/98 |
| 6,112,342 A | | 9/2000 | Breda | 4/541.1 |

FOREIGN PATENT DOCUMENTS

| | | | | |
|---|---|---|---|---|
| DE | 715223 | * | 12/1941 | 137/597 |
| GB | 491391 | * | 9/1938 | 137/597 |
| GB | 498834 | * | 1/1939 | 137/597 |

* cited by examiner

*Primary Examiner*—Stephen M. Hepperle
(74) *Attorney, Agent, or Firm*—C. John Brannon; Bingham McHale LLP

(57) ABSTRACT

A bathtub plumbing system including a hand-held shower controlled by a compact pressure balanced, volume and temperature controlled mixing valve. The pressure-balancing valve is installed in a bathtub plumbing set having a hand-held shower accessory. The pressure balancing valve receives hot and cold water from hand-held shower water feed pipes coupled to the main hot and cold water inlet pipes, respectively, located upstream of the respective hot and cold water control valves used to supply water to the main faucet. The hand-held shower hot and cold feed pipes are each hydraulically connected to a first respective hot and cold water inlet of a compact pressure-balancing valve. The hand-held shower is hydraulically connected to the outlet of the pressure-balancing valve by a flexible hose. Hot and cold water entering the pressure-balancing valve is mixed therein independently of the hot and cold water supplied to the faucet. A single control valve may therefore be manipulated to supply pressure and temperature balanced water to the hand-held shower.

7 Claims, 2 Drawing Sheets

HAND-HELD SHOWER SYSTEM WITH INLINE ADJUSTABLE TEMPERATURE/ PRESSURE BALANCED MIXING VALVE

CROSS-REFERENCE TO RELATED APPLICATIONS

This application claims priority to U.S. Provisional Application Ser. No. 60/240,609 filed Oct. 16, 2000.

TECHNICAL FIELD OF THE INVENTION

The present invention relates generally to bathtub plumbing systems and, more particularly, to a bathtub plumbing system including a hand-held shower feature controlled by a pressure balanced, volume and temperature controlled mixing valve.

BACKGROUND OF THE INVENTION

Hand-held showers are common accessories included in bathtub plumbing packages. Typically, a hand-held shower 10 is plumbed by combining the hot water inlet and the cold water inlet lines 12, 14 from the separate hot and cold control valves 16, 18 at a diverter valve 20. (See FIG. 1) A flexible hose 22 fluidically connects the hand-held shower 10 to the diverter valve 20. The diverter valve 20 combines hot and cold water arriving through the respective hot and cold inlet lines 12, 14, but does not act to balance the temperature or pressure of the water. Temperature and pressure adjustments are made by opening the hot and cold control valves 16, 18 in conjunction.

The above system has the disadvantage of requiring simultaneous control of both the hot and the cold control valves 16, 18 to achieve a desired pressure and temperature combination. While it is not difficult to achieve either a desired water temperature or a desired water pressure in this way, achieving both at once is trickier. In addition to the inherent difficulties of achieving a water flow having both the desired temperature and pressure, the situation is further complicated because the system ideally requires one hand to adjust the hot water valve 16, a second hand to adjust the cold water valve 18, and a third hand to manipulate the hand-held shower 10. While the hot and cold water valves 16, 18 may be adjusted prior to opening the diverter valve 20, the effective water pressure exiting the hand-held shower 10 is usually different from that exiting the tub faucet 24, since the faucet 24 and the hand-held shower 10 typically have different dimensions. Therefore, fine-tuning adjustments are required to arrive at the desired water temperature-pressure combination. Alternatively, the hot and cold water valves 16, 18 may be adjusted while the diverter valve 20 is open and water is flowing from the hand-held shower 10, but this necessitates simultaneous control of both valves 16, 18 and the hand-held shower 10, posing a difficulty for a single individual having only two hands.

While pressure balancing valves are well known in the art, they have typically been too large, bulky and expensive to be readily accommodated into a hand-held shower system.

There is therefore a need for a way of easily controlling the water temperature and pressure of a hand-held shower system. The present invention is directed towards meeting this need.

SUMMARY OF THE INVENTION

The present invention relates to a bathtub plumbing system including a hand-held shower feature controlled by a pressure balanced, volume and temperature controlled mixing valve. In a preferred embodiment, a compact pressure-balancing valve is installed in a bathtub plumbing set (such as a Roman tub set) having a hand-held shower accessory. The pressure balancing valve receives hot and cold water from hand-held shower water feed pipes tapped into the main hot and cold water inlet pipes, respectively, upstream of the respective hot and cold water control valves used to supply water to the main faucet. The hand-held shower hot and cold feed pipes are each fluidically connected to a first respective hot and cold water inlet of a compact pressure-balancing valve. The hand-held shower is fluidically connected to the outlet of the pressure-balancing valve by a flexible hose. Hot and cold water entering the pressure-balancing valve is mixed therein independently of the hot and cold water supplied to the faucet. A single control valve may therefore be manipulated to supply pressure and temperature balanced water to the hand-held shower.

One object of the present invention is to provide an improved hand-held shower system. Related objects and advantages of the present invention will be apparent from the following description.

DETAILED DESCRIPTION OF THE PREFERRED EMBODIMENT

Figure 1:
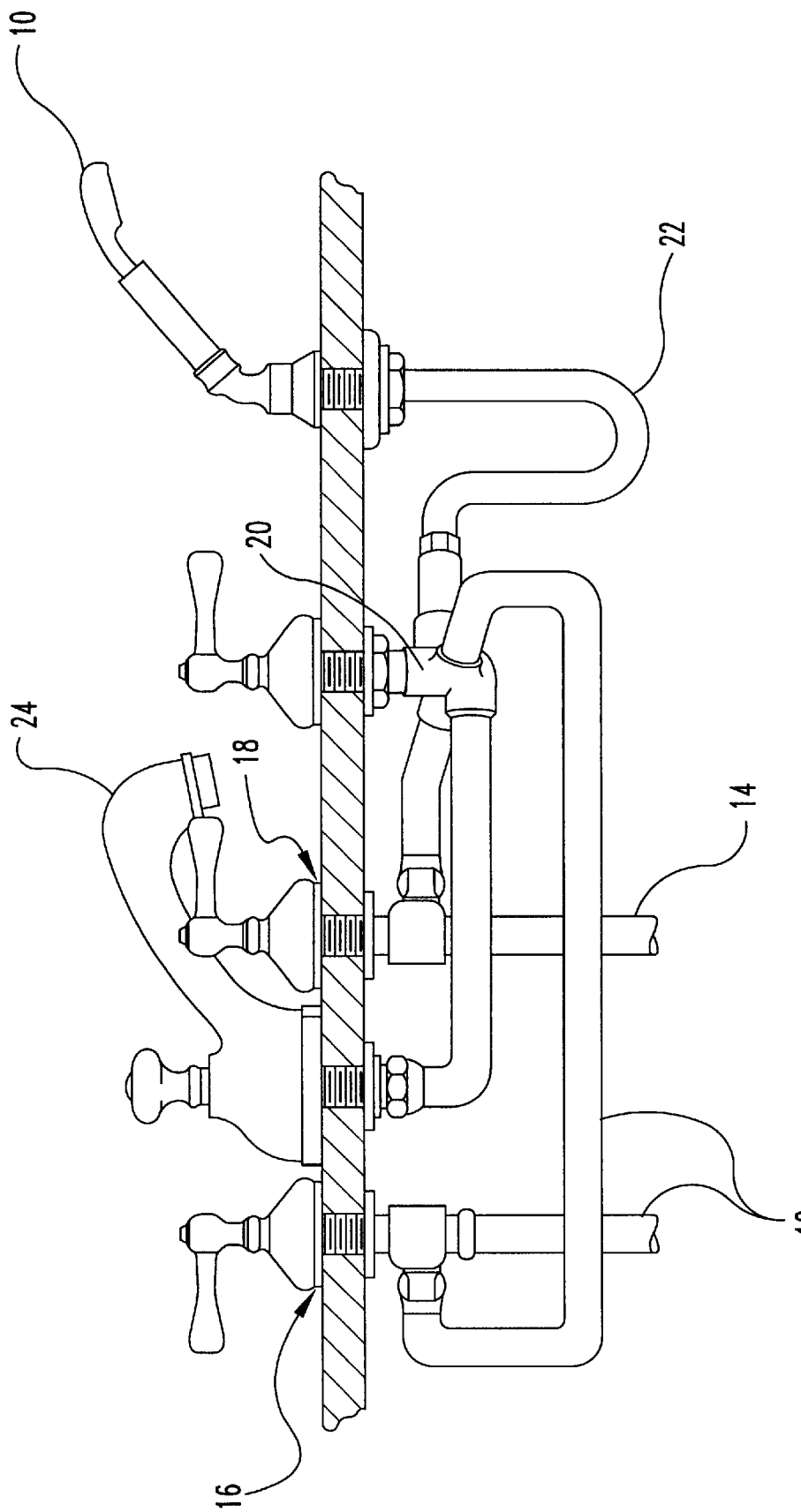
FIG. 1 is a schematic view of a prior art hand-held shower system including a diverter valve.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
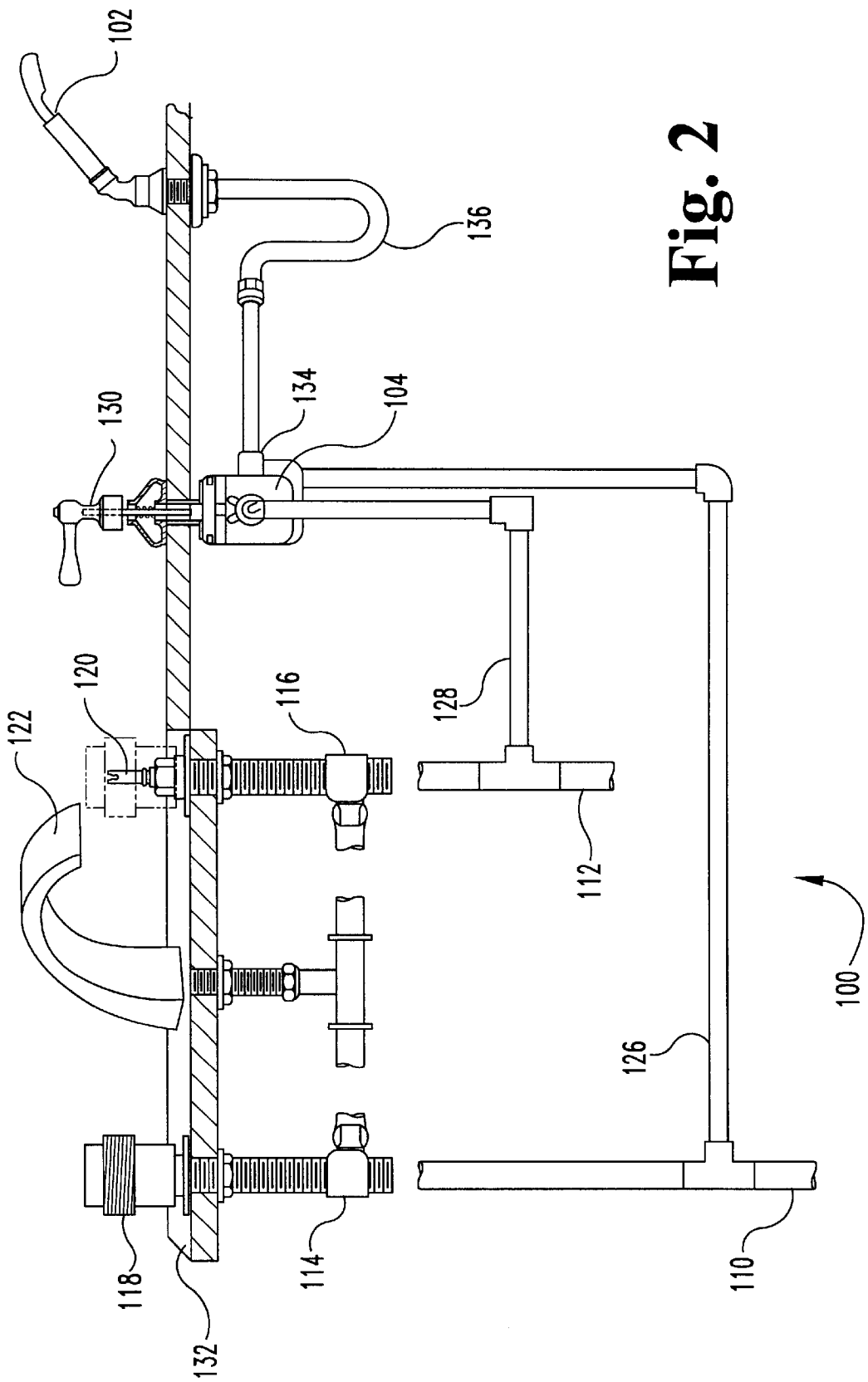
FIG. 2 is a schematic view of the hand-held shower system of the present invention.

FIG. 2 schematically illustrates a first embodiment of the present invention, a bathtub plumbing system 100 including a hand-held shower 102 controlled by a pressure balanced valve 104, such as, for example and not by limitation, a Grohe temp valve, model number 34-910-000. The system 100 also includes a main hot water pipe 110 and a main cold water pipe 112 for supplying hot and cold water, respectively. The main hot water pipe 110 is connected to a hot water control valve 114 and the main cold water pipe is connected to a cold water control valve 116. The hot and cold water control valves 114, 116 are respectively operated by a hot and cold water control valve handles 118, 120. The hot and cold water control valves 114, 116 are fluidically connected to a faucet 122.

A hand-held shower hot water feed pipe 126 is fluidically connected to the main hot water pipe 110 upstream of the hot water control valve 114. A hand-held shower cold water feed pipe 128 is likewise fluidically connected to the main cold water pipe 112 upstream of the cold water control valve 116. The hand-held shower hot and cold water feed pipes 126, 128 are fluidically connected to a compact pressure balanced valve 104 spaced from the hot and cold water valves 114, 116. The compact pressure balanced valve 104 also includes a mixed water control valve handle 130 extending therefrom. Preferably, the valves 114, 116, 104 are located beneath the tub surface 132 while the handles 118, 120, 130 extend through the tub surface 132. More preferably, the dimensions of the fixtures located below the surface are such that the handles 118, 120, 130 may be arranged in an ergonomic and decorative design.

The pressure-balanced valve 104 also includes an outlet 134 to which the hand-held shower 102 be fluidically connected. Preferably, a length of flexible hose 136 fluidically connects the pressure-balanced valve 104 to the hand held shower 102.

In operation, the pressure balanced valve 104 serves to mix the hot and cold water flowing thereinto independently of the water supplying the faucet 122. The pressure-balanced valve 104 allows single-handle control of the temperature and pressure of the water supplied the to hand-held shower 102. The use of a compact pressure balanced valve 104 in the system 100 eliminates the necessity for a diverter valve, thereby reducing the number and complexity of the required plumbing fittings as well as reducing the cost of the system 100.

What is claimed is:

1. A bathtub plumbing system having an anti-scald hand-held shower system connected without the need of a diverter, comprising:
    a bathtub deck:
    a primary hot water supply pipe extending to the bathtub deck;
    a primary cold water supply pipe extending to the bathtub deck;
    a hot water control valve mounted to the bathtub deck and fluidically connected to the primary hot water supply pipe;
    a cold water control valve mounted to the bathtub deck and fluidically connected to the primary cold water supply pipe;
    a faucet fluidically connected to the hot water control valve and fluidically connected to the cold water control valve;
    a secondary hot water pipe fluidically connected to the primary hot water pipe;
    a secondary cold water pipe fluidically connected to the primary cold water pipe;
    a hand held shower;
    a pressure balanced valve fluidically connected to the secondary hot water pipe and fluidically connected to the secondary cold water pipe; and
    a flexible hose fluidically connecting the hand held shower to the pressure balanced valve;
    wherein the hand held shower may be actuated independently of the hot and cold water control valves; and
    wherein the hand held shower outputs water of a predetermined pressure.

2. The plumbing system of claim 1 wherein the pressure balanced valve further comprises an inner chamber adapted to intermix hot and cold water, wherein the pressure balanced valve is adapted to supply water to the hand held shower, and wherein the pressure balanced valve is adapted to balance the pressure of the water supplied to the hand held shower.

3. The plumbing system of claim 1 wherein the pressure balanced valve is adapted to supply water to the hand held shower and wherein the pressure balanced valve is adapted to balance the temperature of the water supplied to the hand held shower.

4. The plumbing system of claim 1 wherein the pressure balanced valve further comprises an inner chamber adapted to intermix hot and cold water, wherein the pressure balanced valve is adapted to supply water to the hand held shower, wherein the pressure balanced valve is adapted to balance the temperature of the water supplied to the hand held shower, and wherein the pressure balanced valve is adapted to balance the pressure of the water supplied to the hand held shower.

5. A bathtub-mounted hand held shower system controlled by a single valve without the need of a diverter, comprising:
    a bathtub;
    a hot water supply connected to the bathtub;
    a cold water supply connected to the bathtub;
    a spigot connected to the bathtub;
    hot and cold spigot valves connected between the spigot and the respective hot and cold water supplies;
    a pressure balanced valve connected to the bathtub and connected in hydraulic communication with the respective hot and cold water sources;
    a hand held shower head; and
    a flexible hose hydraulically connecting the hand held shower head to the pressure balanced valve;
    wherein the hand held shower head may be actuated independently of the hot and cold spigot valves to actuate a flow of water of characterized by a substantially predetermined temperature and pressure.

6. A method for controlling the water temperature and pressure output from a hand held shower head, comprising the steps of:
    a) connecting a pressure balanced valve having an output and a plurality of inputs to a bathtub deck;
    b) hydraulically connecting the pressure balanced valve output to the hand held shower head;
    c) hydraulically connecting a hot water source and a cold water source to respective pressure balanced valve inputs; and
    d) controlledly opening the pressure balanced valve to achieve a water output from the hand held shower characterized by a predetermined pressure and temperature.

7. The method of claim 6, wherein the pressure balanced valve is adapted to supply water to the hand held shower head, wherein the water has a water pressure and a water temperature, and wherein the water pressure and water temperature are controlled by the pressure balanced valve.

* * * * *

UNITED STATES PATENT AND TRADEMARK OFFICE
CERTIFICATE OF CORRECTION

PATENT NO. : 6,644,333 B2  Page 1 of 1
APPLICATION NO. : 09/960440
DATED : November 11, 2003
INVENTOR(S) : Cary Gloodt It is certified that error appears in the above-identified patent and that said Letters Patent is hereby corrected as shown below:

In column 2, line 47, please delete "34-910-000" and insert in lieu thereof --34-901-000--.

Signed and Sealed this

Fourteenth Day of November, 2006

JON W. DUDAS
*Director of the United States Patent and Trademark Office*

(12) EX PARTE REEXAMINATION CERTIFICATE (6467th)
United States Patent
Gloodt

(10) Number: US 6,644,333 C1
(45) Certificate Issued: Oct. 7, 2008

(54) HAND-HELD SHOWER SYSTEM WITH INLINE ADJUSTABLE TEMPERATURE/PRESSURE BALANCED MIXING VALVE

(75) Inventor: Cary Gloodt, Indianapolis, IN (US)

(73) Assignee: CEG Holdings, LLC, Oak Lawn, IL (US)

Reexamination Request:
No. 90/008,341, Jan. 26, 2007

Reexamination Certificate for:
Patent No.: 6,644,333
Issued: Nov. 11, 2003
Appl. No.: 09/960,440
Filed: Sep. 21, 2001

Certificate of Correction issued Nov. 14, 2006.

Related U.S. Application Data

(60) Provisional application No. 60/240,609, filed on Oct. 16, 2000.

(51) Int. Cl.
*E03B 1/00* (2006.01)
*F17D 1/00* (2006.01)
*F17D 3/00* (2006.01)

(52) U.S. Cl. .................... 137/9; 137/100; 137/597; 4/663

(58) Field of Classification Search .............. 4/678
See application file for complete search history.

(56) References Cited

U.S. PATENT DOCUMENTS

| | | |
|---|---|---|
| 917,157 A | 4/1909 | Sandham |
| 2,296,128 A | 9/1942 | Weingarten |
| 3,105,519 A | 10/1963 | Fraser |
| 4,349,149 A | 9/1982 | Humpert |

OTHER PUBLICATIONS

Grohe Faucet Technology, 1999 Price List, pp. 1 and 53.
Grohe® Faucet Technology, 1999 Price List, pp. 51 and 53.
Grohe America, Inc., "Water + Comfort. An International Collection," 1993, 3 pages.
GROHEart® Grohete® Grohedal®, Catalogue 96/97, 2 pages.

*Primary Examiner*—Aaron J. Lewis

(57) ABSTRACT

A bathtub plumbing system including a hand-held shower controlled by a compact pressure balanced, volume and temperature controlled mixing valve. The pressure-balancing valve is installed in a bathtub plumbing set having a hand-held shower accessory. The pressure balancing valve receives hot and cold water from hand-held shower water feed pipes coupled to the main hot and cold water inlet pipes, respectively, located upstream of the respective hot and cold water control valves used to supply water to the main faucet. The hand-held shower hot and cold feed pipes are each hydraulically connected to a first respective hot and cold water inlet of a compact pressure-balancing valve. The hand-held shower us hydraulically connected to the outlet of the pressure-balancing valve by a flexible hose. Hot and cold water entering the pressure-balancing valve is mixed therein independently of the hot and cold water supplied to the faucet. A single control valve may therefore be manipulated to supply pressure and temperature balanced water to the hand-held shower.

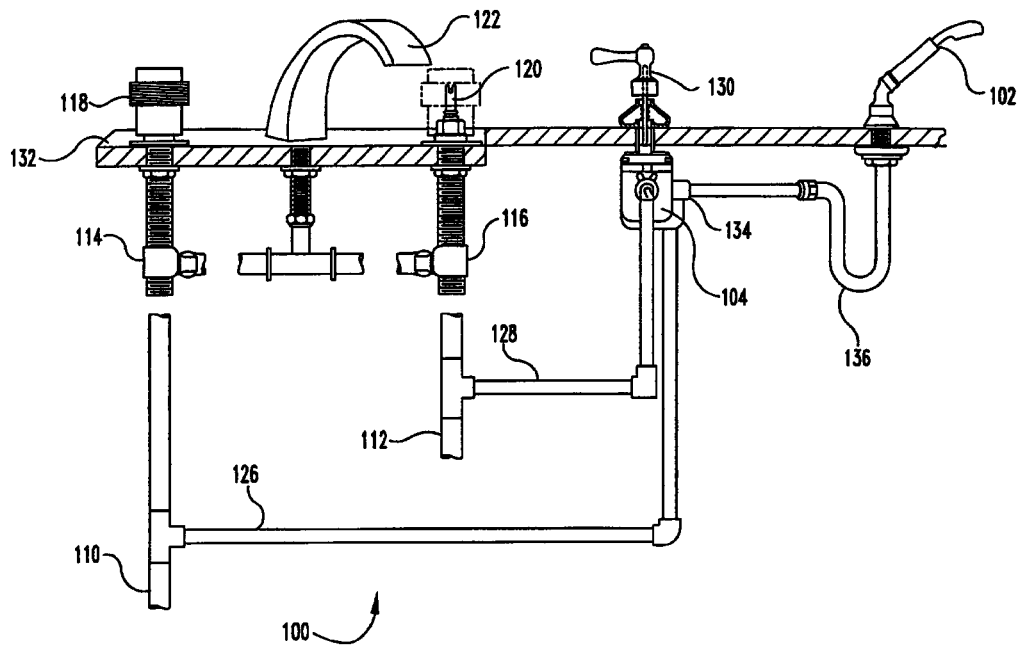

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–5 is confirmed.

Claims 6–7 are cancelled.

\* \* \* \* \*